United States Patent
Faustlin et al.

[15] 3,697,893
[45] Oct. 10, 1972

[54] MICROWAVE MODULATOR HAVING INPUT MODULATION SIGNAL PROBE WITH ADJUSTABLE ELECTRICAL CHARACTERISTICS

[72] Inventors: James L. Faustlin, Plano; Eliseo Saenz, Garland, both of Tex.

[73] Assignee: Collins Radio Company, Dallas, Tex.

[22] Filed: May 17, 1971

[21] Appl. No.: 144,030

[52] U.S. Cl. ............ 332/16 R, 325/445, 331/96, 332/30 V, 333/83 R, 334/15
[51] Int. Cl. ............................................ H03c 3/20
[58] Field of Search ............ 332/29, 29 M, 30, 30 V; 334/15; 331/36 C, 96, 97; 333/83; 325/445

[56] References Cited
UNITED STATES PATENTS

| | | | |
|---|---|---|---|
| 3,443,247 | 5/1969 | Fjerstad | 332/30 V |
| 3,178,654 | 4/1965 | Linker et al | 333/83 R |
| 3,423,698 | 1/1969 | Wilson | 325/445 X |
| 3,423,701 | 1/1969 | Kach | 333/83 R |
| 3,443,244 | 5/1969 | Cook | 333/83 R X |
| 3,596,204 | 7/1971 | Vane | 333/82 B |

*Primary Examiner*—Alfred L. Brody
*Attorney*—Henry K. Woodward and Robert J. Crawford

[57] ABSTRACT

A microwave resonant cavity modulator including an input modulation signal probe with means for adjusting the electrical characteristics of said probe for improving modulation sensitivity and linearity over a relatively wide frequency range.

6 Claims, 3 Drawing Figures

PATENTED OCT 10 1972  3,697,893

INVENTORS
JAMES L. FAUSTLIN
ELISEO SAENZ

BY H. K. Woodward
ATTORNEY

MICROWAVE MODULATOR HAVING INPUT MODULATION SIGNAL PROBE WITH ADJUSTABLE ELECTRICAL CHARACTERISTICS

This invention relates generally to electrical frequency modulators, and more particularly to frequency modulators in the microwave frequency range.

Microwave modulators employing an adjustable cavity resonator with a modulation signal feed means are known in the art. A difficulty encountered with such modulators is the critical design of the signal feed means whereby modulation sensitivity and linearity are maintained over a relatively wide frequency range. Heretofore, a "cut and try" technique has been employed in designing such probes, with probes not providing the desired linearity and/or sensitivity at a particular frequency being discarded. Needless to say, such design efforts do not lend themselves to mass production of such feed probes.

An object of this invention is an improved microwave frequency modulator.

Another object of the invention is a microwave modulator with an adjustable signal feed means thereby improving modulation sensitivity and linearity.

Features of the invention include a signal feed means, in combination with cavity resonator modulation means, comprising a probe structure insertable in said cavity. The probe includes feed portion comprising a coaxial line having a radiation suppressing choke and feed-through capacitor in line therewith. An adjustable inductive element connects the coaxial line to a coupling portion including capacitive means for coupling the probe to the center conductor within the cavity.

Advantageously, the modulation sensitivity of the probe may be established by adjustable positioning the capacitive means with respect to the cavity center conductor, and modulation linearity may be adjusted for the desired operating frequency by varying the inductive element.

These and other objects and features of the invention will be more fully understood from the following detailed description and appended claims when taken with the drawing, in which:

Figure 1:
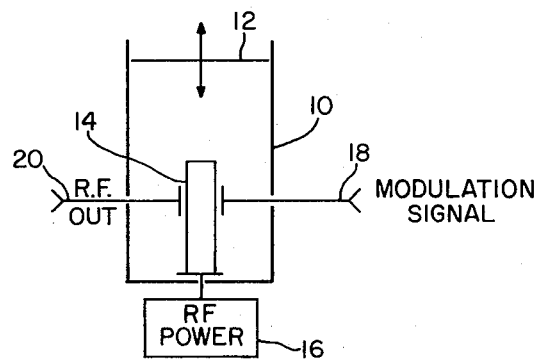
FIG. 1 is a schematic diagram of a resonant cavity microwave modulator.

Referring now to the drawing, FIG. 1 is a schematic diagram of a microwave frequency modulator in which a modulation probe in accordance with the present invention is especially useful. The modulator includes a resonant cavity 10 including an adjustable cover 12 which attaches to cavity 10 and positionably determines the resonant frequency of the cavity. Typically, for a 2 giga hertz resonator, the position of the adjustable cover can vary the resonant frequency a total of 150 mega hertz.

Within cavity 10 is a center conductor 14 which is insulatively mounted to the bottom of the cavity and which receives RF power from a suitable source 16, and coupling means 18 couples the modulation signal to center connector 14. Similarly, the modulated output signal is coupled from center conductor 14 through suitable means 20. In actual practice, input means 18 and output means 20 are at 90° orientation with respect to each other, but for illustration purposes they are shown at 180°.

Microwave modulators employing resonant cavities such as shown in FIG. 1 are known in the art. However, difficulty is encountered in designing the input means which couples the modulating signal to the resonant cavity inasmuch as the probe must be critically tuned for the particular frequency to be modulated and for the particular resonance of the cavity. The criticality of the probe design manifests itself in the modulation sensitivity, or necessary input voltage for satisfactory modulation, and also in modulation linearity across the frequency spectrum of the input signal.

Probe means in accordance with the present invention allows for adjustment of probe parameters to accommodate a larger linear frequency range and sensitivity adjustment. Importantly, the probe is very repeatable in construction thereby providing higher yields in manufacture.

Figure 2:
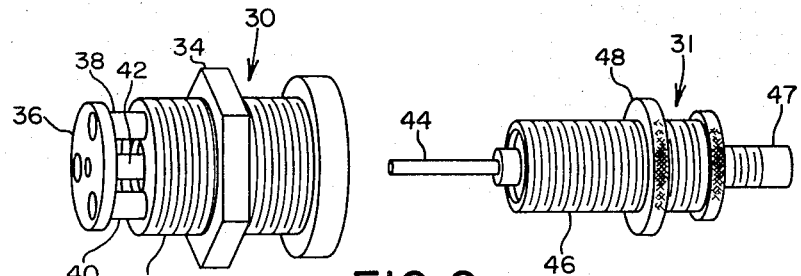
FIG. 2 is an exploded perspective view of modulation signal probe means in accordance with the invention.

FIG. 2 is an exploded perspective view of modulation signal probe means in accordance with the invention. Generally, the probe comprises a coupling portion 30 and a feed portion 31. Coupling portion 30 includes a threaded body 32 which mates with a hole through the wall of the resonant cavity with adjustment nut 34 or the like provided for establishing the depth of insertion of the coupling means in the cavity. At the end of coupling portion 30 is a capacitive coupling plate 36 which is mounted to body 32 by means of insulating standoffs 38 and one variable voltage capacitor (varactor) 40 which couples plate 36 to body 32. Also electrically connected to plate 36 and insulatively mounted inside of body 32 is a hollow conductor 42 which includes means for electrically contacting conductor means inserted therethrough.

Referring now to the feed portion 31, the inductive conductor 44 which insertably electrically contacts hollow conductor 42 in the coupling portion 30 is insulatively mounted in a threaded housing 46 to a coaxial connector 47 at the opposite extremity of the feed portion. Housing 46 threadably mates with housing 32 of the coupling portion 30, and the position of inductive probe means 44 with respect to coupling plate 36 is determined by the amount of insertion of threaded housing 46 within housing 32 of the coupling portion. Adjustable nut 48 is provided on housing 46 to establish this extent of insertion.

Figure 3:
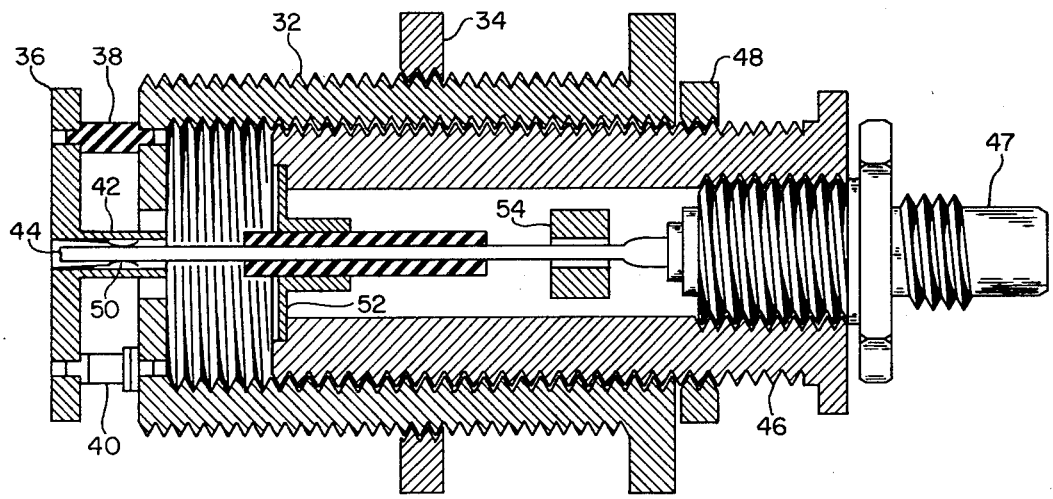
FIG. 3 is a sectional plan view of the assembled probe illustrated in FIG. 2.

Referring to FIG. 3, the assembled probe is shown in section view illustrating the cooperative nature of the coupling portion and the feed portion and further illustrating details of the feed portion. It will be noted that conductor 42 includes spring contacts 50 which engage the inserted portion of conductor member 44. Conductor 44 is insulatively mounted within housing 46 with capacitive means 52 providing a RF bypass between conductor 44 and the resonant cavity ground. Further, a ferrite bead 54 is positioned within housing 46 and functions as a RF choke. Thus, bypass capacitor 52 and RF choke 54 cooperatively prevent the passage of microwave frequency signals back through the input signal path.

Advantageously, the spacing of capacitive coupling plate 36 with respect to the center conductor within the resonant cavity may be adjusted by the amount of insertion of housing 32 within the wall of the resonant cavity, thereby adjusting the modulation sensitivity of the modulator for the particular frequencies employed. Further, at the microwave frequencies of the modulator, conductor 44 functions as a variable inductor in line with the coaxial input connector 48 and capacitive plate 36. By adjusting the length of conductor 44 the inductance of the modulation probe is altered and modulation linearity for the particular input frequency band may thereby be adjusted. Thus, with the adjustable inductor, the microwave signal can be linearly modulated over a 600 mega hertz tuning range.

Since a relatively wide range of adjustment is allowed by the spacing of capacitive coupling plate 36 and the inductance of conductor 44, the probe has proved to be very repeatable in construction, thereby allowing higher yields in manufacture. In one embodiment designed to feed a signal in the 5 mega hertz range to the cavity tuned to 2 giga hertz, the variable inductive conductor is a three-eights length of 20 gauge wire. Bypass capacitor 52 is a coaxial capacitor manufactured by Erie Technological Corporation, vendor P/N 2404-014-C18PF-10, and RF choke 54 is a parisitic suppressor manufactured by Ferrocube Company, vendor P/N 56-59065/3B.

FM modulators utilizing probes in accordance with the present invention have proved to be more adaptable over wider frequency ranges with the linearity and sensitivity adjustment being easily implemented. While the invention has been described with reference to a specific embodiment, the description is illustrative and not to be construed as limiting the scope of the invention. Various modifications and changes may occur to those skilled in the art without departing from the spirit and scope of the invention as defined by the appended claims.

We claim:

1. In combination with a microwave resonant cavity modulator, a modulation input signal probe with adjustable electrical characteristics for improving modulation sensitivity and linearity over a frequency range comprising an adjustable coupling portion including a housing variably insertable through the wall of the resonant cavity and having a coupling plate for variably coupling an input signal to said resonant cavity and contact means within said housing and interconnected with said coupling plate for insertably receiving an inductive means; and an adjustable feed portion insertable into said coupling portion and including an adjustable inductive conductor means variably insertable in said contact means, connector means for receiving an input signal, and means including frequency trap means interconnecting said connector means and said inductive conductor means.

2. A modulator input signal probe as defined by claim 1 wherein said coupling plate is mounted to said housing by stand-off means including an electrically variable capacitive means.

3. A modulator input signal probe as defined by claim 2 wherein said contact means comprises a cylindrical member including a spring contact threin, and said inductive means comprises a length of wire insertable into said cylindrical means in electrical contact with said spring contact.

4. A modulator input signal probe as defined by claim 3 wherein said frequency trap means comprises a by-pass capacitor and a RF choke.

5. A microwave modulator comprising a resonant cavity; a center conductor within said cavity; input signal means for coupling an input signal to said center conductor; output signal means for coupling a modulated signal from said center conductor; said input signal means comprising a modulation input probe with adjustable electrical characteristics for improving modulation sensitivity and linearity over a frequency range comprising an adjustable coupling portion including a housing variably insertable through the wall of the resonant cavity and having a coupling plate for variably coupling an input signal to said resonant cavity and contact means within said housing and interconnected with said coupling plate for insertably receiving an inductive means, and an adjustable feed portion insertable into said coupling portion and including an adjustable inductive conductor means variably insertable in said contact means, connector means for receiving an input signal, and means including frequency trap means interconnecting said connector means and said inductive conductor means; whereby modulation sensitivity may be adjusted by the spacing between said coupling plate and said center conductor, and modulation linearity may be adjusted by varying the effective inductance of said inductive conductor portion.

6. A microwave modulator as defined by claim 5 wherein said coupling plate is mounted to said housing by stand-off means including an electrically variable capacitive means, said contact means comprises a cylindrical member including a spring contact therein, and said inductive means comprises a length of wire insertable in said cylindrical means, and said frequency trap means comprises a by-pass capacitor and a RF choke.

* * * * *